No. 880,930. PATENTED MAR. 3, 1908.
C. B. STILLWELL.
NUT LOCK.
APPLICATION FILED NOV. 27, 1907.
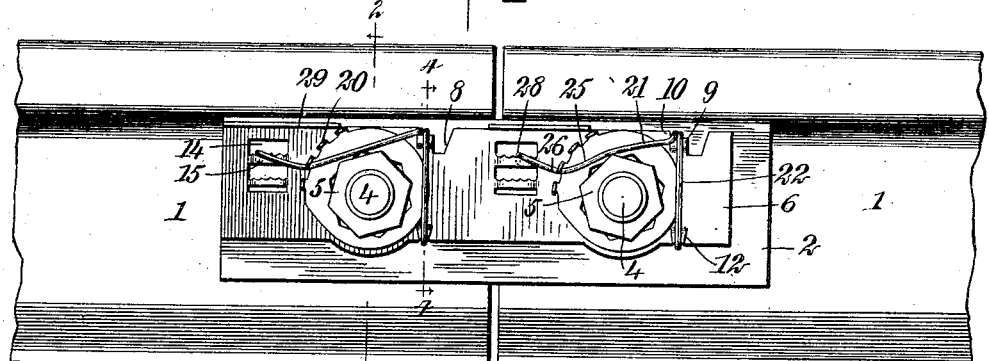
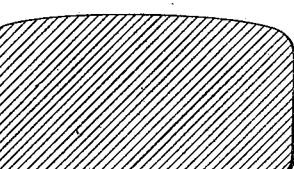
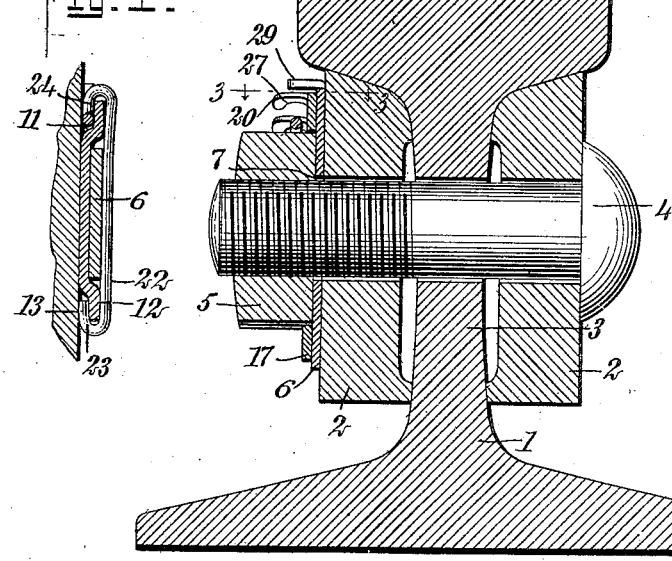
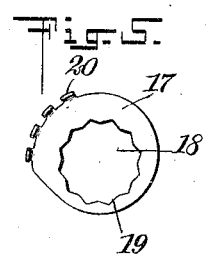
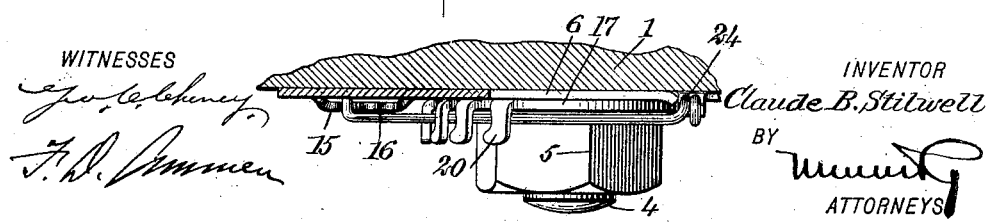
WITNESSES
INVENTOR
Claude B. Stilwell
BY
ATTORNEYS

UNITED STATES PATENT OFFICE.

CLAUDE B. STILLWELL, OF JACKSONVILLE, FLORIDA.

NUT-LOCK.

No. 880,930.           Specification of Letters Patent.           Patented March 3, 1908.

Application filed November 27, 1907. Serial No. 404,014.

*To all whom it may concern:*

Be it known that I, CLAUDE B. STILLWELL, a citizen of the United States, and a resident of Jacksonville, in the county of Duval and State of Florida, have invented a new and Improved Nut-Lock, of which the following is a full, clear, and exact description.

This invention relates to nut locks which are used for preventing the accidental displacement of nuts from their bolts.

The invention is capable of use in many connections, but is especially adapted for use at rail joints for preventing the disconnection of the nuts on the bolts which fasten the fish plates in position.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a rail connection illustrating the invention as applied in practice; Fig. 2 is a vertical section taken on the line 2—2 of Fig. 1, and upon an enlarged scale; Fig. 3 is a horizontal section taken on the line 3—3 of Fig. 2; Fig. 4 is a section on the line 4—4 of Fig. 1, but upon an enlarged scale; and Fig. 5 is a detail view, being a side elevation of a lock ring which constitutes a feature of the invention.

Referring more particularly to the parts, 1, 1 represent the abutting ends of two railway rails. At the joint oppositely disposed fish plates 2 are provided, which are attached to the web 3 of the rail by means of through bolts 4. The projecting ends of these bolts are provided with nuts 5 of the usual construction. In applying my invention, I provide a main plate 6 which is formed of sheet steel or similar material. This plate is of elongated rectangular form, as shown, and is provided with openings 7 which enable it to be applied on the outer face of the fish plate before the nuts 5 are screwed into position.

At suitable points on its upper edge, the plate 6 is provided with notches or recesses 8, and to the left of each of these notches the material of the plate is offset forwardly so as to form an offset tongue 9. This tongue is cut off so that its end is not flush with the upper edge of the plate. In this way a small notch 10 is formed at the end of the tongue, and under the tongue 9 a recess 11 is formed as indicated in Fig. 4. Opposite the tongues 9 and on the lower edge of the plate, outwardly offset tongues 12 are pressed from the body of the plate in such a way that pockets 13 are formed under the plate, as indicated in Fig. 4. The tongues 9 and 12 are disposed to the right of the bolts, as indicated in Fig. 1. On the opposite sides of the bolts, that is, on the left thereof, the body of the plate is punched so as to form openings 14, the lower edges of the said openings being formed by horizontal transverse bars 15 which are left in place and which are offset outwardly, as indicated most clearly in Fig. 3. These bars 15 are serrated or formed with notches 16 in their upper edges. After the nuts 5 have been screwed up, I place over each of them a locking ring 17, the construction of which is very clearly shown in Fig. 5. This ring has a substantially annular body and presents an opening 18, the edge of which is provided with a plurality of notches 19 arranged an equal distance apart. The arrangement of these notches is such as to enable the locking plate to engage the corners of a hexagonal or square nut or similar nut in different positions.

At a suitable point on the edge of the locking ring, it is provided with a plurality of upwardly and outwardly projecting fingers 20 which are disposed a slight distance apart as shown. When the locking rings are applied to the nuts, these fingers 20 should be disposed on the left and above the horizontal line connecting the axes of the bolts, as indicated in Fig. 1. After the locking rings have been applied as described, they are locked in position each by means of a locking bar 21. The general form of these locking bars is illustrated in Fig. 1. Each locking bar comprises a vertical extension 22, the lower end of which is bent upwardly so as to form a toe or hook 23 which is adapted to be received in the pocket 13, as indicated in Fig. 4. The upper end of the vertical extension 22 is doubled and bent over so as to form a similar hook or toe 24 which is adapted to be received under the corresponding tongue 9. From the toe 24 an inclined extension 25 extends across the face of the locking ring above the nut, and this extension 25 is formed with a slight bend 26 which is adapted to be forced under one of the projecting fingers 20.

In order to enable the fingers to hold the locking bar in position, the under edges of the fingers are preferably curved or recessed, as indicated at 27 in Fig. 2. Beyond the bend 26 the inclined extension 21 extends slightly upwardly, and is formed into an end hook 28 which is adapted to be hooked over one of the bars 15, engaging the teeth 16 as illustrated. In order to apply the locking bars as described the hooks 23 should be placed in position first. The notches 8 then permit the upper hooks 24 to be brought into alinement with the tongues 9 and at the right-hand edges thereof. After being brought into this position, the bars are rotated toward the left on the hooks 23 as a pivot. In this way the hooks 24 seat themselves under the tongues and in the notches which are formed respectively at the ends of the tongues. The inclined extensions of the bars are then forced into position as described. The fact that the locking ring is formed with a plurality of notches, enables it to be applied in a number of different positions. In this way the locking rings may be applied so as to bring some one of the fingers 20 into a suitable position to facilitate the application of the inclined extension 25 under it as described.

On the upper edge of the main plate 5, forwardly projecting flanges or lips 29 are formed, which extend outwardly beyond the bars 15, and act as a protection for the bars from a wrench when the wrench is being applied to the nuts. When the main plate 6 is made double, as illustrated in Fig. 1, so that it can be applied to two bolts simultaneously, it, of course, is in fixed position. Where it is desired to apply the device to a single bolt, the main plate should be made large enough so that its edge engages the flange of the rail or the head thereof, as will be readily understood, so as to prevent its rotation.

The arrangement described is that which is adopted where the thread is a right-hand thread, for instance, because the tendency of the nut would be to rotate in an anti-clockwise direction. The tendency of rotation of the locking ring would then be anti-clockwise, so that the finger 20 which engages the upper side of the locking bar tends to move downwardly. This downward movement is, of course, resisted by the locking bar. By reversing the position of the openings, the device is adapted for bolts with left-hand threads, as well as right.

The locking bar 21 is preferably formed of resilient wire so that when being applied to secure the locking plate, the extension 25 may be readily sprung to one side so as to bring it into the proper engagement with the locking ring and the bar 15 of the main plate.

Having thus described my invention, I claim as new and desire to secure by Letters Patent:

1. In a nut lock, in combination, a bolt, a nut mounted thereupon, a main plate upon which said nut seats and having an opening receiving said bolt, a locking ring engaging said nut and adapted to prevent the rotation thereof, said locking ring having an outwardly projecting finger formed thereupon, and a locking bar adapted to be attached to said main plate after the said nut is seated, and having an extension engaging said main plate at two points, said extension engaging said finger at a point between said first points, and affording means for locking said ring against rotation.

2. In a nut lock, in combination, a bolt, a nut mounted thereupon, a main plate having an opening through which said bolt passes and upon which said nut seats, a locking ring having an opening with a plurality of notches therein adapted to engage said nut in a plurality of positions, a locking ring having a plurality of fingers projecting outwardly on the edge thereof, a locking bar adapted to be applied after the nut is seated, means for mounting the same upon said plate, said main plate further having engaging means adapted to receive said locking bar to hold the same in place, said locking bar having an extension passing across the face of said locking ring and engaging said fingers and said engaging means.

3. In a nut lock, in combination, a bolt, a nut mounted thereupon, a main plate having an opening receiving said bolt upon which said nut seats, a locking ring adapted to engage said nut in a plurality of positions, a locking bar having hooks engaging the opposite edges of said plate and removably secured thereto, said locking bar having an extension engaging said locking ring to prevent the rotation thereof, and means formed on said plate for engaging said extension.

4. In a nut lock, in combination, a bolt, a nut mounted thereupon, a main plate under said nut, said main plate being offset outwardly so as to form pockets at opposite edges thereof, one of said edges having a notch adjacent to said pocket, a locking bar having an extension with hooks formed at the ends thereof adapted to be received in said pockets, said notch affording means for receiving one of said hooks and attaching said locking bar, said locking bar further having a second extension, and a locking ring adapted to engage said nut to prevent the rotation thereof, and having means for engaging said second extension.

5. In a nut lock, in combination, a bolt, a nut mounted thereupon, a main plate upon which said nut seats, said main plate having outwardly offset tongues forming pockets, and having a notch adjacent to one of said pockets, and a locking bar having an extension extending transversely of said main plate and having hooks adapted to be received in said pockets to hold said locking bar in position, said locking bar having a second extension or locking ring adapted to engage said nut in a plurality of positions, and having fingers adapted to engage said second extension, said main plate having an offset bar adapted to engage the end of said second extension to hold the same in position.

In testimony whereof I have signed my name to this specification in the presence of two subscribing witnesses.

CLAUDE B. STILLWELL.

Witnesses:
   GEO. W. MOZO,
   T. T. WILLIAMS.